United States Patent [19]

Oxley et al.

[11] Patent Number: 4,716,524
[45] Date of Patent: Dec. 29, 1987

[54] APPARATUS AND METHOD REMOVING INCREMENT/DECREMENT PAIRS TO DECIMATE A BLOCK REFERENCE STREAM

[75] Inventors: Donald W. Oxley, Carrollton; David H. Bartley; Timothy J. McEntee, both of Dallas, all of Tex.

[73] Assignee: Texas Instruments Incorporated, Dallas, Tex.

[21] Appl. No.: 719,778

[22] Filed: Apr. 4, 1985

[51] Int. Cl.[4] .............................................. G06F 1/00
[52] U.S. Cl. .................................................... 364/200
[58] Field of Search ... 364/200 MS File, 900 MS File

[56] References Cited
U.S. PATENT DOCUMENTS 4,016,545  4/1977  Lipovski ........................... 364/900

Primary Examiner—Raulfe B. Zache
Attorney, Agent, or Firm—Kenneth C. Hill; James T. Comfort; Melvin Sharp

[57] ABSTRACT

A reference count decimator and method of operating a computer system includes a decimator queue for containing indications of pointer reference count increments. Apparatus is provided for determining if a referencing event would cause a decrement of a reference count, and for searching the decimator queue to determine if a counterpart of the reference event exists in the queue, to thereby define an increment/decrement pair. If an increment/decrement pair is determined to exist in the queue, the increment/decrement pair is cancelled from the queue so that the increment/decrement point reference pairs are removed from the computer system without actually modifying the reference count indications associated with the memory blocks.

32 Claims, 5 Drawing Figures

APPARATUS AND METHOD REMOVING INCREMENT/DECREMENT PAIRS TO DECIMATE A BLOCK REFERENCE STREAM

BACKGROUND OF THE INVENTION

1. Field of the Invention

This invention relates to improvements in computer systems and methods for operating computer systems, and more particularly to improvements in computer systems of the type which use reference counts in the operation and management of the associated computer memory, and still more particularly to improvements in methods and apparatuses for managing the reference counts of a computer system with which the invention is associated.

2. Description of the Prior Art

The development of computer storage or memory management systems has a long history with many related branches of research. Many memory structures are shown by H. M. Deitel, An Introduction to Operating Systems, Addison-Wesley, Mass., Chapter 7, 1982. Other major issues of interest are discussed by Knuth, D., The Art of Computer Programming, Vol. 1: Fundamental Algorithms, Addison-Wesley, Reading, Mass., 1968, and Cohen, J. "Garbage Collection of Linked Structures," Computing Surveys, Vol. 13, No. 3, September, 1981, pp. 341-367.

Becoming of interest with the rapid development in the areas of artificial intelligence is the development of so-called "knowledge bases", large data bases, for use, for instance, in containing extremely large or complex information stores requiring dynamic organization. See, for example, Suwa, M., et al, "Knowledge Base Mechanisms", Preliminary Report on Fifth Generation Computer Systems, ICOT, 1980. Examples of some large data bases under consideration or implemented include, for instance, data bases which contain legal information, such as verbatim case reports, medical information for use in diagnosing possible diseases which present particular symptoms, certain patent information including abstracts, claims, and so forth. In such data bases, it is often desirable to search through sometimes millions of words and characters, then identify a particular record (case, patent, diagnosis, etc.) related to the words and characters.

Typical memory systems with which the invention can be used (although not to which the invention is limited) can be seen in copending patent applications by Oxley et al, entitled "COMPUTER MEMORY SYSTEM", Ser. No. 630,476, filed July 12, 1984 and by Thatte el al, entitled COMPUTER SYSTEM ENABLING AUTOMATIC MEMORY OPERATIONS, Ser. No. 630,478, filed July 12, 1984, both applications being assigned to the assignee hereof and incorporated herein by reference. Portions of a patent application of Oxley et al., entitled COMPUTER MEMORY SYSTEM WITH PARALLEL GARBAGE COLLECTION INDEPENDENT FROM AN ASSOCIATED USER PROCESSOR, Ser. No. 636,187, filed July 31, 1984, assigned to the assignee hereof described reference count objectives and purposes to which the present invention particularly pertains.

The memory system of said copending applications respond to conditions, equations or instructions from a user CPU to allocate memory blocks and allow the user CPU to execute certain instructions with regard to the allocated memory blocks. The memory system also is garbage collected in accordance with certain design parameters. The memory system operation is based upon the use of binding registers which interface the user CPU to the memory, which enables the memory to be seen by the user CPU as a block oriented memory, and which permits the memory management unit to control memory overhead functions. Despite the actual or hardware configuration of the memory system, it has an apparent logical memory organization, as seen by the user CPU. (The logical memory organization is referred to as a "logical address space", as distinguished from a "virtual address space" which is a memory representation or abstraction as seen by the memory management unit, and from a physical memory, which is the actual physical memory elements of the memory system.) The binding registers serve as a window or portal into and out of the logical memory system. Through use of the binding registers, the user processor can be directly addressing only a limited number of blocks at any instant.

The user CPU uses a set of individual binding registers as a base for referencing some value within a previously bound block. The manner by which the user CPU addresses the binding registers can be, for example, by specifying a particular binding register. Memory operations in a computer system (aside from data writes and retrievals) can be viewed as a series of events which, among other things, create and destroy pointers. For each event, certain information is provided which determines whether a pointer is either created or destroyed. In computers of the type of interest herein, a count is maintained as a part of the operation of the computer of the number of pointers which reference blocks of memory which have been allocated or defined. This count is referred to herein as the "reference count". Thus, the action of creating or destroying a pointer also results in a reference count of the computer memory system being either incremented or decremented. The combination of several such events, one after another in a temporal sense, is referred to herein as a "reference stream".

The phenomenon of referencing (creating a pointer to) a block and then, relatively quickly, dereferencing (destroying) the same pointer sometimes occurs quite frequently, for example, when "CDRing" down a list or when there is a call to a procedure followed by a return from the procedure. Each reference and dereference to the same block can be called a "systematic" reference/dereference pair, and the associated necessary action to the reference count of the block can be called a systematic increment/decrement pair. (Pairs of this type are of primary interest herein, as distinguished from accidentally created pairs.)

Updating a block's reference count takes processor time, and performance can be especially degraded when the block whose reference count needs to be updated is not in the main memory of the computer system. Use of valuable processor time and degradation of performance is especially wasteful when it involves the increment of a reference count which is decremented soon thereafter, as would occur, for instance, in an increment/decrement pair as described above.

SUMMARY OF THE INVENTION

Accordingly, in light of the above, it an an object of the invention to provide an apparatus and method to reduce (desimate) the work caused by the reference stream by removing increment/decrement pairs whenever possible.

This, and other objects, features, and technical advantages will become apparent to those skilled in the art from the following detailed description, when read in conjunction with the accompanying drawings and appended claims.

In accordance with a preferred embodiment of the invention, a reference count decimator and method of operating a computer system is provided for controlling reference counts in a computer system of the type in which a count of the number of pointers which reference blocks of memory are held in association with the associated respective blocks of memory, and in which the count is incremented and decremented as pointers to the blocks are created and destroyed. The decimator includes a decimator queue for containing indications of pointer reference count increments. In addition, means are provided for determining if a referencing event would cause a decrement of a reference count, and means responsive to the referencing event determining means searches the decimator queue to determine if a counterpart of the reference event exists in the queue, to thereby define an increment/decrement pair. Means are also provided for cancelling the increment/decrement pair from the queue if the counterpart is determined to exist in the queue, so that the increment/decrement pointer reference pairs are removed from the computer system without actually modifying the reference count indications associated with the memory blocks.

The apparatus and method can be used in conjunction with computer systems of the type having either a single processor tasked both with creating and destroying references and for managing the blocks of memory, or with a computer system of the type having more than one processor, with each processor being tasked with the mentioned responsibilities. In the event the invention is used in conjunction with a plural processor system, the reference count decimator is placed in front of the memory processor. The apparatus includes an associative memory in which each location within said associative memory is either empty or contains a block identifier of a block whose reference count increment is outstanding. Two RAMs are also associated with said reference count decimator. Two RAM locations are associated with each associative memory location which indicate the predecessor and successor, in a temporal sense, of the block identifier.

Thus, as will become apparent, the reference count decimator will process requests to "process increment", "process decrement", and, occasionally, to "clear" its queue.

BRIEF DESCRIPTION OF THE DRAWINGS

The invention is illustrated in the accompanying drawing, in which.

In the various figures of the drawing, like reference numerals are used to denote like or similar parts.

DETAILED DESCRIPTION OF THE PREFERRED EMBODIMENTS

Figure 1:
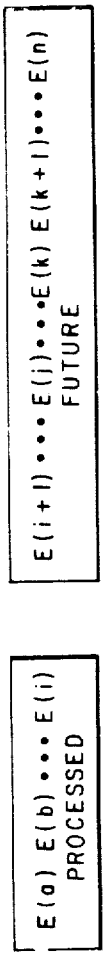
FIG. 1 is a diagrammatic illustration of a reference stream in a computer system, not using a decimator, in accordance with the prior art.
Figure 2:
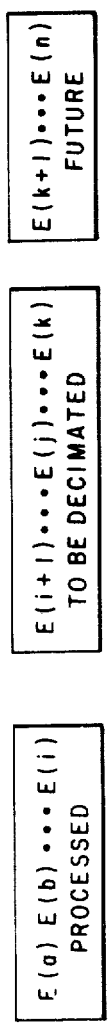
FIG. 2 is a diagrammatic illustration of a reference stream in a computer system, identical to FIG. 1 except for the inclusion of a reference count decimator, in accordance with the invention.

As mentioned, in computers of the type of interest herein, a so-called "reference count" as a part of the computer operation is maintained. The reference count represents the number of pointers which exist which reference a particular allocated or defined block of memory. The action of creating or destroying a pointer results in a reference count of the computer memory system being either incremented or decremented. The combination of several such events, one after another in a temporal sense, is referred to herein as a "reference stream". A symbolic representation of a reference stream in a computer system without a decimator, in accordance with the prior art, is depicted in FIG. 1. Each single event is represented by the letter "E". As mentioned, in the processing of the reference stream, references are either created or destroyed. Thus, the events on the left of FIG. 1 labeled "processed" are events which have caused the reference counts of the referent blocks to be incremented or decremented. The events on the right labeled "future" have yet to occur. A symbolic representation of a reference stream in a computer system with a decimator in accordance with the invention is shown in FIG. 2. The reference stream is similar to that shown in FIG. 1, except for the inclusion of the reference counts to be decimated. The events on the left, labeled "processed", have caused the reference counts of the referent blocks to be incremented or decremented, in the manner as above described; that is, the reference or dereference has been made and the appropriate reference count has been incremented or decremented. As before, the events on the right labeled "future" have yet to occur. On the other hand, the events $E(i+1)$ to $E(k)$ in the center, labeled "to be decimated", have occurred, that is, a reference to a block has been made or destroyed to a block, but the reference count of the referents have not yet been incremented or decremented. The objective is to eliminate the need to increment those reference counts, if possible. It will be seen that such elimation may be contingent on the "future" events on the right, as will become evident below.

Broadly, and with reference now to FIG. 3, in the operation of the reference count "decimator" 30 of the invention, a decimator queue 20 (below described in detail) is provided, and events $E(i+1)$ to $E(k)$ to be decimated are placed in it. When a "future" event occurs that might cause a decrement of a reference count (that is, if it would destroy a pointer), a search is made in the decimator queue 20 to determine if a counterpart in an increment/decrement pair exists in the queue. For example, assume event $E(j)$ is a reference to a block. If a future event $E(k+1)$ is a dereference to the same block, $E(j)$ and $E(k+1)$ form an increment/decrement pair. These two events cancel each other out as far as the need to update the referent's reference count is concerned. Event E(j) can thus be eliminated from the decimator queue, as long as E(k+1) is also eliminated. (As mentioned, the decimator queue only contains requests which would require that a reference count be incremented, since one primary goal of the invention is to reduce systematic increment/decrement pairs, and not necessarily the infrequent decrement of a reference count followed by an increment to the same reference count.)

Thus, in operation, what transpires when a new event is introduced is determined by the type of the event which occurs and the contents of the queue. If the new event is a reference which would therefore cause an increment, the increment is entered into the queue (assuming that the queue is not already full—a condition discussed below). On the other hand, if the new event is a dereference which would therefore cause a decrement, the decimator queue is searched in an attempt to find a corresponding increment. If it is found, the increment/decrement pair is eliminated. If it is not found, the decrement must be processed in the usual manner; that is, the reference count of the associated block must be located and decremented.

It will be appreciated that practical limitations exist upon the size of the decimator queue which can be provided; therefore, it is possible that the queue can become full. In that event, a new event which is a reference to a block would necessarily have to be processed immediately, or space would have to be made in the queue and the increment added to the queue. (It would be unfortunate to process the new reference count increment immediately, only to have a decrement request for the same reference count soon after.) The preferable choice of increments to process would be the longest pending increment in the queue, since there is a greater chance that its corresponding decrement does not exist (i.e., they are not associated with a systematic increment/decrement pair) or will unlikely appear in the near future. This dynamic "flushing" of the longest pending increments also improves the chances that the queue will not remain full.

Reference is again made to copending patent application, Ser. No. 636,187, filed July 31, 1984 by Oxley et al, in which garbage collector and reference count mechanisms act to cross-check each other. In such cases where cross-checking occurs, all increments in the decimator queue must be processed before garbage collection begins on the virtual address space. The reference counts of all blocks would then be accurate at the time of collection.

Figure 3:
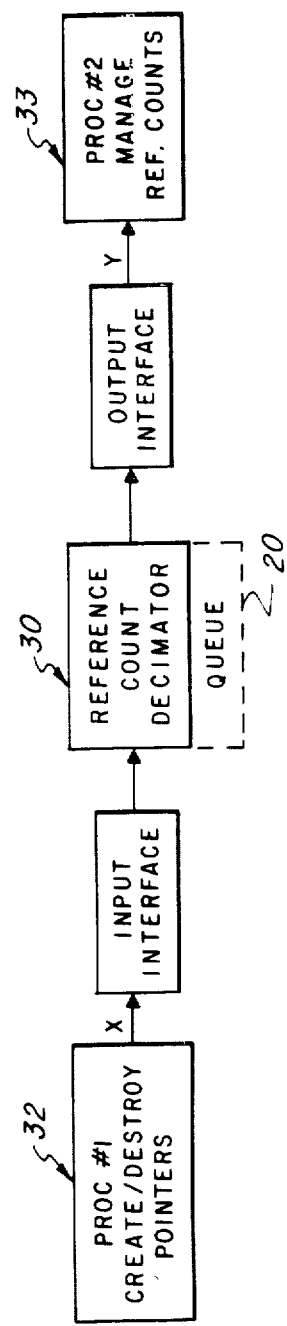
FIG. 3 is a diagrammatic representation of a computer system including a reference count decimator, in accordance with the invention, placed between a processor which is tasked with creating and destroying references and a processor which manages the block reference counts.

As shown in FIG. 3, in the implementation of the reference count decimator, the decimator 30 is placed between a first processor 32 which is tasked with creating and destroying references and a second processor 33 which manages the block reference counts. The processors 32 and 33 may be separate devices (in the manner for example, as set forth in said Oxley et al. application Ser. No. 636,187) or may, in fact, be the same processor which serves both functions. Regardless of the system processor configuration, due to the operation of the decimator 30, the output from the decimator 30, shown as Y, and the input to the decimator 30, shown as X, appear to be the same. Put another way, the requests coming from the decimator 30 to the second processor 33 appear as if no decimator existed and the requests were coming directly from the first processor 32.

Figure 4:
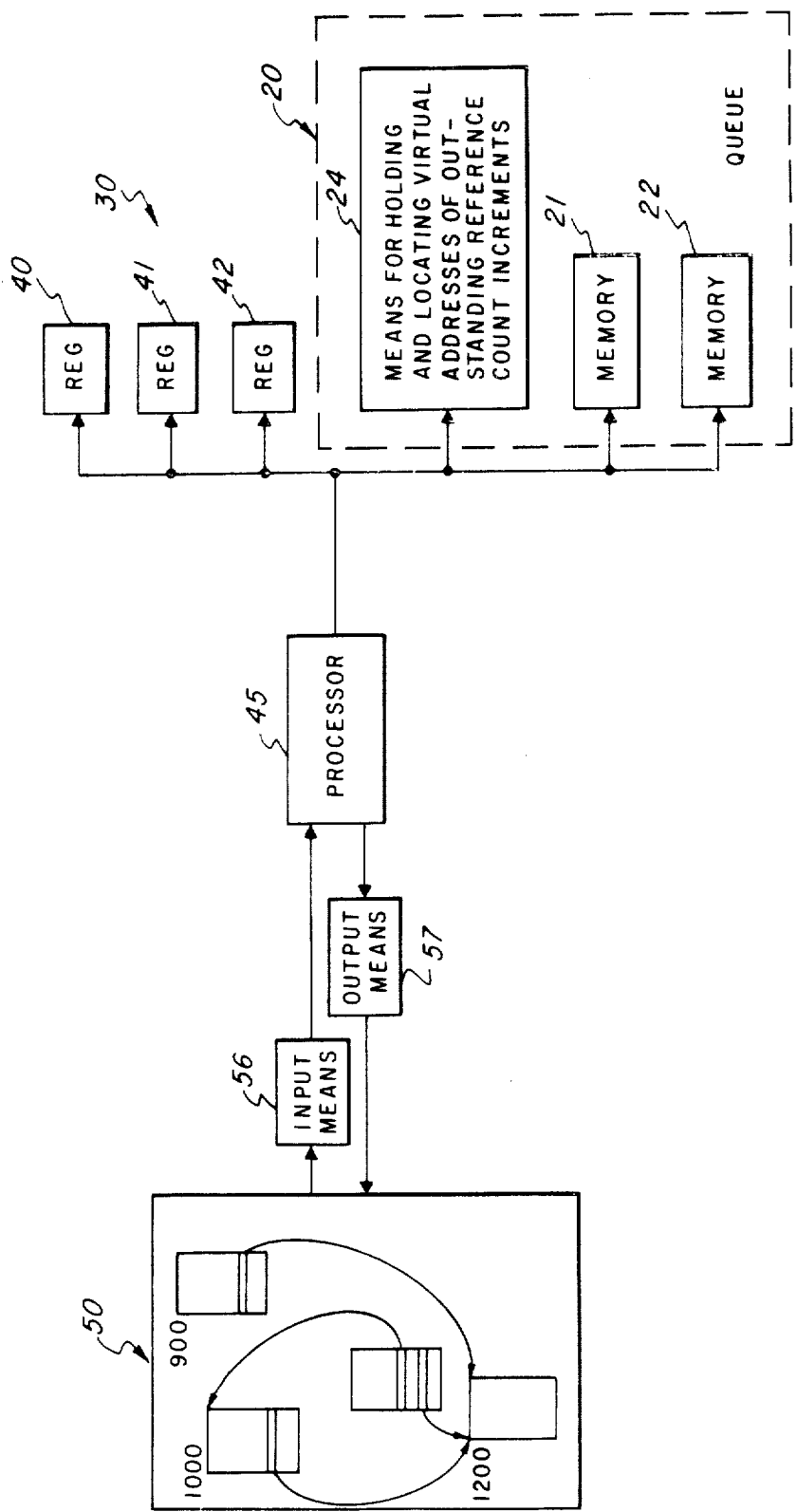
FIG. 4 is a block diagram of a computer system using a decimator in accordance with the invention.

It will be appreciated that the decimator queue 20, which is described in greater detail below with reference to FIG. 4, is an essential component of the decimator. The decimator receives a limited number of requests which originate in the processor which creates and destroys pointers. For example, the processor requests that the decimator process either an increment or a decrement. In sending such a request, it must also give the decimator a block identifier (the virtual address or identification data) of the block whose reference count is required to be incremented or decremented. The decimator may also receive a request to "clear" its decimator queue. The decimator will, at that time, transmit all block identifiers of blocks whose reference count increments are outstanding to the processor which manages the reference counts before the collection begins. (It should be noted that the term "block identifier" in the context of this invention is intended to refer to any unique identifier of the block used to control reference counting, such as a vertical address of a block, a number assigned to the block, and so on.)

A particular implementation of a reference count decimator designed for purposes of maximum speed is shown in FIG. 4, and makes use of two random access memories (RAMs) 21 and 22 and a means for holding and locating block identifiers of outstanding reference count increments 24 (referred to herein simply as the holding and locating means). As will be apparent to those skilled in the art, there are many ways to construct the holding and locating means, such as, for example, providing a hash table, an associative memory, a sequentially searchable memory, and so on. The number of locations in the holding and locating means 24, and thus the length of the queue, is a function of such variables as the frequency of requests to the decimator, and the number of increment requests versus the number of decrements in a given period of time. In other words, the size of the queue should be such that it is generally nearly full, but seldom completely full. For purposes of illustration, a queue with eight locations is assumed, the operation of which is shown in FIG. 5 and described below in detail.

The holding and locating means 24 and memories 21 and 22 are controlled by a processor 45. The processor 45 can be a separate dedicated processor for the operation of the decimator 30, or can be a shared processor with another function of the system with which the decimator is associated, as will be apparent to those skilled in the art. Also provided as a part of the decimator 30 are three registers 40, 41, and 42, which as will be described below, serve as indicators of the "first", "last", and "free" queue locations of the decimator queue. The input and output to the decimator 30 is provided from a memory system 50 by appropriate input and output means 56 and 57, respectively.

Figure 5:
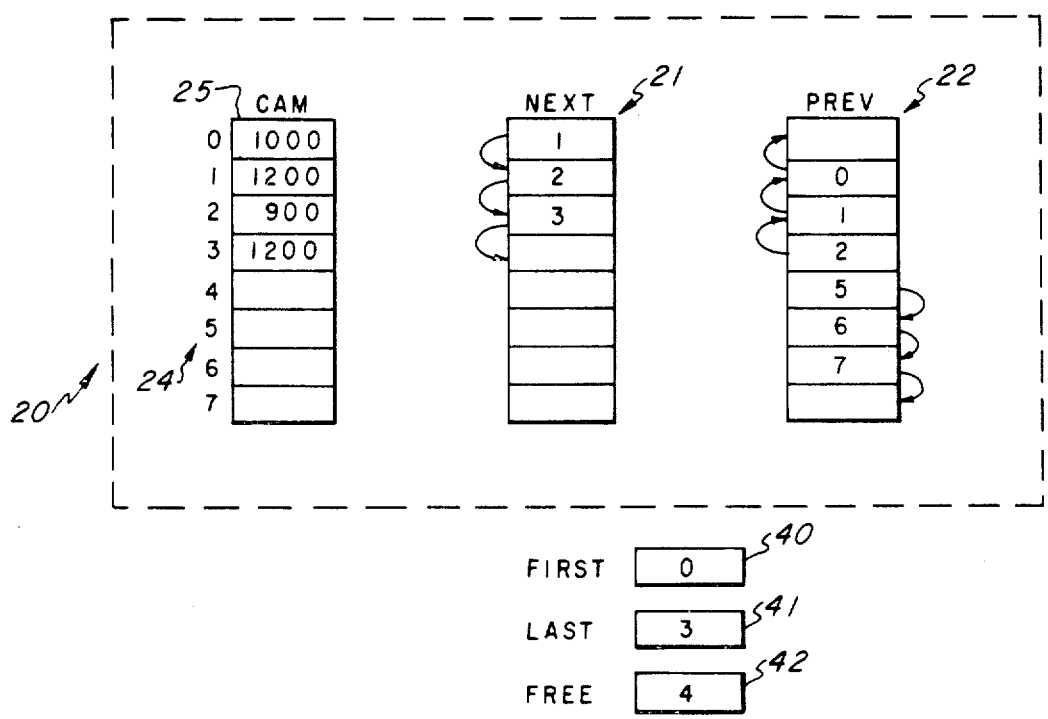
FIG. 5 is a block representation of the various components of the decimator, in accordance with the invention, showing the operation thereof in managing reference counts.

With reference now to FIG. 5, the holding and locating means 24 is provided in a preferred embodiment of the invention by a content addressable memory (CAM) 25, such memories being well known in the art. Each location of the CAM 25 is either empty or contains the block identifier of a block whose reference count increment is outstanding or unprocessed. In FIG. 5, for instance, the block identifiers are virtual addresses 900, 1000, and 1200, which correspond to the addresses of blocks in the memory system. Address 1200 appears twice to illustrate the occurrence of two reference count increments to the same address, in which case, both are entered in the CAM 25. Two RAMs 21 and 22 are provided in association with the CAM 25, such that associated with each location of the CAM 25 are respective RAM locations which indicate the predecessor (PREV) and successor (NEXT), in a temporal sense, of the virtual address. For instance, virtual address 1200, in location 1 of the CAM 25, was entered in the queue after virtual address 1000, in location 0, and before virtual address 900, in location 2. This "double link" for each location becomes important when a virtual address is removed from the queue, as described below. Locations which are empty are also linked together, as has been done in the "previous" RAM. Also associated with the queue are three registers, 40, 41, and 42 in which information is stored which respectively identifies, by location, the first (oldest) and last (newest) virtual address still present in the queue, and a pointer to the first link of the free locations.

As mentioned above, the reference count decimator will receive requests to "process increment", "process decrement", and, occasionally, will be requested to "clear" its queue. These requests are handled as follows.

When a request to process increment reaches the decimator, the block identifier associated with the increment is added to the queue as long as the queue is not full. For example, assume a reference has been made to a block at virtual address 2000 and the queue is as shown in FIG. 5. Location 4 is found to be the first location on the free list. It is therefore used as the associative memory location for placing the virtual address 2000, and the "free" storage cell is updated to identify the next location on the free list, location 5. The "last" storage cell is also updated to point to location 4, since it now contains the most recent virtual address in the queue. Lastly, the corresponding locations in the two RAMs are updated (location 3 in the "next" RAM, and location 4 in the "previous" RAM) in order to keep the links accurate. The increment has thus been successfully processed without any interruption to the processor which manages the reference counts in the blocks.

As mentioned above, there may be instances when a request to process an increment is received at a time when the queue is full. The queue is defined as being full when it is found that the "free" storage cell 42 does not point to any location in the queue. In such case, the "oldest" pending block identifier then contained in the queue is sent on to the processor which manages reference counts to be processed in the usual manner by updating the reference count of the block to which it points. The new block identifier is then placed in the queue. The oldest blcok identifier in the queue is identifiable by reading the "first" storage cell 40 to determine its location in the CAM 24. The "first" storage cell 40 would then be updated to point to what was the second oldest block identifier in the queue. Of course, the "last" storage cell 41 and the two RAMs 21 and 22 would also be updated in the same way described above.

Taking now into account the issue of multiple increments pending for the same block identifier, several solutions are possible. The simplest solution is to enforce a restriction that only one increment can be pending for each block identifier. At the outset of a request to process an increment, a search is performed, as described in the discussion of processing a decrement, and, if the block identifier is found to be present in the queue, the block identifier is passed directly to the processor which manages the reference counts. The request to increment the reference count is then processed immediately. Another alternative solution is to allow duplicate reference counts in separate locations (as shown). This requires a more intricate holding and locating means when a search is done; the search would have to be more in the order of "Giver me the first occurrence of block identifier X". A third alternative solution is to add another RAM (not shown) which is used as a counter for each location which indicates the number of outstanding increments for the block identifier at that location. A block identifier would therefore not be deleted until its associated counter has the value zero.

In distinction to a process increment, a process decrement results in either the removal from the queue of the corresponding increment to the same block identifier, if one is present, or in the passing of the block identifier to the processor so that it can decrement the appropriate reference count. Therefore, a search of the queue must first be made to determine if the block identifier is present. (It should be noted that no search is necessary if the queue were empty, as determined by checking to see if the "first" storage cell points to a valid location.)

If the block identifiers are placed in respective locations of the CAM 24, then the search to determine if a particular address is present can be done very quickly. However, in place of the CAM 24 a RAM could be used to contain the block identifiers (for reduced cost) and a hash table used to enter new addresses and a hash key used for a search. (This configuration is not shown.) The loss of performance in the table search and the necessary time necessary to update the table when a table entry is removed would have to be taken into consideration. Another viable method of placing, searching, and removing the block identifiers in RAM would be by keeping the addresses sorted and performing a sequential search, binary search, etc. Such a method would, in fact, reduce performance even more. Using an associative memory, although more costly in hardware, would bring about the best performance.

If the search concludes that the block identifier of a matching increment is present in the queue, that location in the associative memory is reinitialized to a non-block identifier value. This effectively eliminates the increment of the pair and, thus the decrement is processed. The state of the queue must be kept accurately, so updates are needed to reflect the elimination of the block identifier at the known location. For instance, the freed location must be placed on the free list. Referring now again to FIG. 5, assume that a request was made to the decimator to process a decrement for the block at block identifier 900. After a search, 900 was found at location 2. 900 is then removed from the associative memory and location 2 is added to the beginning of the free list in register 42. Location 2 of the "previous" RAM 22 and location 1 of the "next" RAM 21 are updated to make the doubly-linked list accurate. Although not in the case for the example just described, but had the removed block identifier been the oldest or youngest entry in the queue, it would also be necessary to update the "first" or "last" storage cells 40 or 41. (It should be noted that the steps necessary to remove a pending increment as a consequence of processing a decrement also apply to the removal of the oldest pending increment when the queue is full and processing a new increment is requested—with the exception that the vacated location need not be added to the free list, since it will be used immediately to hold the new increment.)

The search for an increment matching the decrement being processed may reveal that the increment is not present in the queue. In that case, the information is merely passed directly on to the processor which manages the reference counts so that the appropriate reference count can be immediately decremented.

The last request which is of concern is the clear request, the purpose of which is to "flush" the contents of the queue after sending the block identifiers of all blocks with pending increments to the processor which manages the reference counts. Beginning with the location identified by the "first" storage cell, all block identifiers still in the queue can be found by following the list in the "next" RAM. The queue is then reinitialized. Each location of the associative memory is given a non-block identifier value, the doubly-linked list is destroyed, and all locations are linked up to the free list.

Although the invention has been described and illustrated with a certain degree of particularity, it is understood that the present disclosure has been made by way of example, and that numerous changes in the combination and arrangement of parts may be resorted to by those skilled in the art without departing from the spirit and the scope of the invention as hereinafter claimed.

What is claimed is:

1. Apparatus for removing increment/decrement pairs, in a computer system of a type in which a count of pointers which reference blocks of memory is incremented and decremented, comprising:
    means for determining an occurrence of a reference count increment/decrement pair;
    and means connected to said determining means for decimating the referecne count by deleting the determined increment/decrement pair.

2. In a computer system of a type in which a reference count of pointers which reference blocks of memory are held in association with associated respective blocks of memory, and in which the count is incremented and decremented as pointers to the blocks are created and destroyed, a reference count decimator for controlling the reference counts, comprising:
    a decimator queue for containing indications of pointer reference count increments;
    means for determining if a referencing event would cause a decrement of a reference count;
    means connected to said referencing event determining means and to said decimator queue for searching the decimator queue to determine if a counterpart of said referencing event exists in the queue, thereby defining an increment/decrement pair; and
    means connected to said searching means for cancelling the increment/decrement pair from the queue if said counterpart is determined to exist in the queue;
    whereby increment/decrement pointer reference pairs are removed from the computer system without actually modifying the reference count indications associated with said memory blocks.

3. The apparatus of claim 2 wherein the computer system is of a type which comprises a single processor tasked both with creating and destroying references and for managing the blocks of memory.

4. The apparatus of claim 2 wherein the computer system is of a type which comprises first and second processors, the first processor being tasked with creating and destroying references and the second processor being for managing the blocks of memory,
    and wherein the reference count decimator is placed between said first and second processors and connected thereto.

5. The apparatus of claim 2 whrein said reference count decimator further comprises means connected to said determining means for holding and locating block identifiers of outstanding reference count increments, in which each location is either empty or contains a block identifier of a block whose reference count increment is outstanding.

6. The apparatus of claim 5 wherein said means for holding and locating block identifiers of outstanding memory comprises a counter for each location which indicates the number of outstanding increments for the block identifier at that location and means for preventing deletion of a block identifier until its associated counter is zero.

7. The apparatus of claim 5 wherein said means for holding and locating block identifiers of outstanding memory comprises means for enforcing a restriction that only one increment can be pending for each block identifier in said holding and locating block identifiers.

8. The apparatus of claim 5, wherein said holding and locating means comprises an associative memory, each location of which is either empty or contains a block identifier of a block whose reference count increment is outstanding, and two RAM locations connected to each associative memory location which indicate any predecessor and successor, in a temporal sense, of the block identifier.

9. The apparatus of claim 8 further comprising means for linking together associative memory locations which are empty.

10. The apparatus of claim 9 further comprising means connected to the queue for identifying, by location, oldest and newest block identifiers present in the queue, and for identifying a pointer to a first link of the empty locations.

11. The apparatus of claim 10 wherein said means for identifying the oldest and newest block identifiers present in the queue comprises memory cells accessible to the decimator.

12. The apparatus of claim 11 further comprising means connected to the queue for determining whether the queue is full when a request to process an increment is received.

13. The apparatus of claim 12 wherein said means for determining whether the queue is full comprises means for determining whether a "free" storage cell points to no location in the queue.

14. The apparatus of claim 13 further comprising means connected to the queue for sending, when the queue is full, the "oldest" pending block identifier increment to a processor which manages reference counts, then placing the new virtual address in the queue.

15. The apparatus of claim 5 further comprising:
    means connected to the holding and locating means for performing a search to determine if the virtual address is present,
    and means connected to the holding and locating means and to the queue, and responsive to a request to decrement a reference count to either (1) remove from the queue an increment corresponding to the same block identifier, if one is present, or (2) pass the block identifier to a processor so that it can decrement a corresponding reference count.

16. The apparatus of claim 5 further comprising means connected to the queue for flushing the queue after sending the block identifiers of all blocks with pending increments to a processor which manages reference counts.

17. A method for removing increment/decrement pairs, in a computer system in which a count of how many pointers reference blocks of memory is incremented and decremented, comprising:

determining an occurrence of a reference count increment/decrement pair;

and decimating the reference count by deleting such increment/decrement pair.

18. A method for controlling reference counts in a computer system in which a count of how many pointers which reference blocks of memory are held in association with associated blocks of memory, and in which the count is incremented and decremented as pointers to the blocks are created and destroyed, comprising:

providing a decimator queue for containing indications of pointer reference count increments;

determining if a referencing event would cause a decrement of a reference count;

searching the decimator queue to determinine if a counterpart of said referencing event exists in the queue in response to said referencing event, and thereby defining defining an increment/decrement pair; and cancelling the increment/decrement pair from the queue if said counterpart is determined to exist in the queue whereby increment/decrement pointer reference pairs are removed from the computer system without actually modifying the actual reference count indications associated with said memory blocks.

19. The method of claim 18 comprising the steps of providing in said computer system a single processor tasked both with creating and destroying references and for managing the blocks of memory.

20. The method of claim 18 further comprising the steps of providing in said computer system a first processor for creating and destroying references and a second processor for managing the blocks of memory, and placing the reference count decimator between said first and second processors.

21. The method of claim 18 further comprising the steps of providing means for holding and locating virtual addresses of outstanding reference count increments, in which each location is either empty or contains a virtual address of a block whose reference count increment is outstanding, and providing two RAMs connected thereto.

22. The method of claim 21 wherein said step of providing means for holding and locating block identifiers of outstanding memory comprises providing a counter for each location which indicates a number of outstanding increments for the block identifier at that location and means for preventing deletion of a block identifier until its associated counter is zero.

23. The method of claim 21 wherein said step of providing means for holding and locating block identifiers of outstanding memory comprises providing means for enforcing a restriction that only one increment can be pending for each block identifier in said block identifiers.

24. The method of claim 21 wherein said step of providing means for holding and locating block identifiers of outstanding reference count increments comprises providing an associative memory and two RAMs.

25. The method of claim 24 further comprising the step of providing two RAM locations associated with each associative memory location which indicate a predecessor and successor, in a temporal sense, of the block identifier.

26. The method of claim 25 further comprising the step of linking together associative memory locations which are empty.

27. The method of claim 26 further comprising the steps of identifying, by location, oldest and newest block identifiers present in the queue, and establishing a pointer to a first link of free locations.

28. The method of claim 27 further comprising the step of determining whether the queue is full when a request to process an increment is received.

29. The method of claim 28 wherein said step of determining whether the queue is full comprises determining whether a "free" storage cell points to no location in the queue.

30. The method of claim 29 further comprising the steps of sending the "oldest" pending block identifier increment to a processor which manages reference counts when the queue is full, then placing the new block identifier in the queue.

31. The method of claim 30 further comprising the steps of:

performing a search to determine if the block identifier is present, and responsively to a request to decrement a reference count either (1) removing a corresponding increment from the queue to the same block identifier, if one is present, or (2) passing the virtual address to a processor so that it can decrement an appropriate reference count, of one is not present.

32. The method of claim 31 further comprising the step of flushing the queue after sending the block identifiers of all blocks with pending increments to the processor which manages the reference counts.

\* \* \* \* \*